United States Patent Office 3,522,288
Patented July 28, 1970

3,522,288
HYDROCYANATION OF OLEFINS
William Charles Drinkard, Jr., Wilmington, Del., and Brian W. Taylor, Orange, Tex., assignors to E. I. du Pont de Nemours and Company, Wilmington, Del., a corporation of Delaware
No Drawing. Filed Nov. 6, 1967, Ser. No. 680,993
Int. Cl. C07c *121/04, 121/30*
U.S. Cl. 260—465.8                                    13 Claims

ABSTRACT OF THE DISCLOSURE

Process of isomerizing 3-pentenenitriles to 4-pentenenitrile using compounds of chromium, molybdenum or tungsten of oxidation state $+1$ or less as catalyst and of adding hydrogen cyanide to carbon-carbon double bonds such as in 4-pentenenitrile at from $-25$ to $200°$ C. using as catalysts an organophosphite complex of molybdenum or tungsten of oxidation state of $+1$ or less.

DESCRIPTION OF THE PRIOR ART

It is known that the addition of hydrogen cyanide to double bonds adjacent an activating group such as a nitrile or acyloxy group, proceeds with relative ease. However, the addition of hydrogen cyanide to non-activated double bonds proceeds only with difficulty, if at all, and normally requires the use of high pressures of about 1,000 p.s.i. or more and high temperatures in the range of 200 to 400° C. U.S. Pat. No. 2,571,099, issued Oct. 16, 1951, to Paul Arthur, Jr., and Burt Carlson Pratt, discloses a technique which involves the use of nickel carbonyl with or without the addition of a tertiary aryl phosphine or arsine. This process suffers from producing a relatively high percentage of undesirable polymeric products when applied to monoolefinic starting materials and a relatively poor yield in all cases. Furthermore, this process is not satisfactory for the production of adiponitrile from 3- or 4-pentenenitrile. The selective formation of 4-pentenenitrile from 3-pentenenitriles without formation of the thermodynamically more stable 2-pentenenitrile is believed to be unknown in the art.

SUMMARY OF THE INVENTION

The present invention provides a process or a step in a process which produces nitriles from ethylenically unsaturated compounds in high yield, under mild conditions, with minimal formation of polymer.

The process of the present invention is generally applicable to unsaturated compounds of from 2 to 20 carbon atoms having at least one aliphatic carbon-carbon double bond. The 3-pentenenitriles, 4-pentenenitrile and 2-methyl-3-butenenitrile are especially preferred. Suitable unsaturated compounds include monoolefins and monoolefins substituted with groups which do not attack the catalyst such as cyano. These unsaturated compounds include monoolefins containing from 2 to 20 carbon atoms such as ethylene, propylene, butene-1, pentene-2, hexene-2, etc., and substituted compounds such as styrene, α-methyl styrene, 3-pentenenitrile, and 4-pentenenitrile. The process also finds special advantage in the production of 2-methylglutaronitrile from 2-methyl-3-butenenitrile.

In the preferred process of the present invention wherein adiponitrile is formed from 3-pentenenitriles the reaction proceeds in two steps. The first step involves the isomerization of 3-pentenenitriles to 4-pentenenitrile followed by the addition of hydrogen cyanide to 4-pentenenitrile to form adiponitrile.

The first step of isomerizing 3-pentenenitriles to 4-pentenenitrile is catalyzed by compounds of the formula $(Z_3M)_nM'(CO)_{6-n}$ wherein Z is selected from the class consisting of R and OR wherein R is selected from the class consisting of alkyl and aryl groups having up to 18 carbon atoms, wherein M is selected from the class consisting of P, As and Sb, wherein M' is selected from the class consisting of Cr, Mo, and W and wherein $n$ is an integer of from 1 to 4.

The hydrocyanation reaction is catalyzed by compounds of the formula $(Z_3M)_nM''(CO)_{6-n}$ where M'' is selected from the class consisting of Mo and W and wherein Z, M, and $n$ have the meanings defined above.

These catalysts are prepared by heating a compound of the formula $M'(CO)_6$ in the presence of a compound of of the formula $MZ_3$ wherein M', M and Z have the meanings defined above at a moderately elevated temperature such as $150°$ C.

The hydrocyanation or isomerization reaction can be carried out with or without a solvent. The solvent should be a liquid at the reaction temperature and inert towards the unsaturated compound and the catalyst. Generally, such solvents are hydrocarbons such as benzene, xylene, or nitriles such as acetonitrile, benzonitrile, or adiponitrile.

The exact temperature used is dependent, to a certain extent, on the particular catalyst being used, the particular unsaturated compound being used and the desired rate. Generally, temperatures of from $-25°$ C. to $200°$ C. can be used with from $0°$ C. to $150°$ C. being the preferred range for both isomerization and hydrocyanation.

Either reaction may be carried out by charging a reactor with all of the reactants. In the hydrocyanation reaction, preferably the reactor is charged with the catalyst or catalyst components, the unsaturated compound and whatever solvent is to be used and the hydrogen cyanide gas is swept over the surface of the reaction mixture or bubbled through said reaction mixture. If desired, when using a gaseous unsaturated organic compound, the hydrogen cyanide and the unsaturated organic compound may be fed together into the reaction medium. The molar ratio of unsaturated compound to catalyst generally is varied from about 10:1 to 2000:1 unsaturated compound to catalyst for a batch operation. In a continuous operation such as when using a fixed bed catalyst type of operation, a much higher proportion of catalyst may be used such as 1:2 unsaturated compound to catalyst.

Optionally, a promoter may be used to activate the catalyst for the hydrocyanation reaction. The promoter generally is a boron compound or a cationic form of a metal selected from the class consisting of zinc, cadmium, beryllium, aluminum, gallium, indium, thallium, titanium, zirconium, hafnium, erbium, germanium, tin, vanadium, niobium, scandium, manganese, rhenium, palladium, thorium, iron and cobalt.

The preferred boron compounds are borohydrides and organoboron compounds of which the preferred borohydrides are the alkali metal borohydrides and the quaternary ammonium borohydrides particularly the tetra (lower alkyl) ammonium borohydrides. Other suitable promoters are salts of the metals listed above and include aluminum chloride, zinc chloride, cadmium iodide, titanium trichloride, titanium tetrachloride, zinc acetate, ethyl aluminum dichloride, chromic chloride, stannous chloride and zinc iodide. The promoter acts to improve catalyst efficiency and, in certain cases, such as the hydrocyanation of 3- or 4-pentenenitrile to adiponitrile, can result in an improved yield.

If desired, an excess of a ligand such as an aryl phosphite may also be added to the reaction mixture.

Preferably, the reaction mixture is agitated, such as by stirring or shaking.

The cyanated product can be recovered by conventional techniques such as crystallization of the product from solution or by distillation.

The nitriles formed by the present invention are useful as chemical intermediates. For instance, adiponitrile is an intermediate used in the production of hexamethylene diamine which is used in the production of polyhexamethylene adipamide, a commercial polyamide, useful in forming fibers, films and molded articles. Other nitriles can be converted to the corresponding acids and amines which are conventional commercial products.

DESCRIPTION OF THE PREFERRED EMBODIMENTS

Example I

A 50 ml., three-necked, round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 0.5 mmole of $[(C_6H_5O)_3P]_3W(CO)_3$, 1.0 mmole of $(C_6H_5)_3B$, and 20 g. of 3-pentenenitriles. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.1 ml. per hour of hydrogen cyanide (measured as a liquid at 0° C.) is fed to the reaction flask. After 21 hours the reaction is shut down.

Gas chromatographic analysis indicates that the crude reaction mixture contains adiponitrile, 2-methylglutaronitrile and ethylsuccinonitrile.

Example II

A 50 ml., three-necked, round bottom glass flask fitted with a reflux condenser connected to a Dry Ice trap, an inlet, and a magnetic stirrer is set up in an oil bath maintained at 70–100° C., and purged with nitrogen gas. The flask is charged with 1.0 mmole of $$[(CH_3C_6H_4O)_3P]_3Mo(CO)_3$$

2.0 mmoles of $(C_6H_5)_3B$, 10 mmoles of $P(OC_6H_5CH_3)_3$ and 20 g. of 3-pentenenitriles. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.1 ml. per hour of hydrogen cyanide (measured as a liquid at 0° C.) is fed to the reaction flask. After 21 hours the reaction is shut down.

Gas chromatographic analysis indicates that the crude reaction mixture contains 0.16 percent adiponitrile.

Example III

A 50 ml., three-necked, round bottom glass flask fitted with a reflux condenser connected to a Dry Ice trap, an inlet tube above the liquid level, and a magnetic stirrer is set up in an oil bath and purged with nitrogen gas. The flask is charged with 1.0 mmole of $$[(C_6H_5O)_3P]_3Mo(CO)_3$$

1.5 mmoles of $TiCl_3$, and 20 g. of 3-pentenenitriles, and further purged with nitrogen gas after which the oil bath is heated to 100° C. for 24 hours at which time the reaction is shut down.

Gas chromatographic analysis indicates that the crude reaction mixture contains about 6 percent 4-pentenenitrile.

Example IV

A 50 ml., three-necked, round bottom glass flask, fitted with a reflux condenser connected to a Dry Ice trap, an inlet tube above the liquid level, and a magnetic stirrer is set up in an oil bath. The flask is purged with nitrogen gas and charged with 1.06 g. of $$[(C_6H_5O)_3P]_3Cr(CO)_3$$

0.23 g. of $TiCl_3$, and 20 g. of 3-pentenenitriles, and further purged with nitrogen gas, after which the oil bath is heated to 100° C. for 72 hours after which the reaction is shut down.

Gas chromatographic analysis indicates that the crude reaction mixture contains 1 percent 4-pentenenitrile.

Example V

A 50 ml., three-necked, round bottom glass flask, fitted with a reflux condenser connected to a Dry Ice trap, an inlet tube above the liquid level, and a magnetic stirrer is set up in an oil bath. The flask is purged with nitrogen gas and charged with 1.11 g. of $$[(C_6H_5O)_3P]_3Mo(CO)_3$$

0.23 g. of $TiCl_3$, and 20 g. of 3-pentenenitriles, and further purged with nitrogen gas after which the oil bath is heated to 80° C. for 24 hours at which time the reaction is shut down.

Gas chromatographic analysis indicates that the crude reaction mixture contains 2.5 percent 4-pentenenitrile.

We claim:

1. A process which comprises contacting an unsaturated organic compound having olefinic carbon-carbon unsaturation selected from the class consisting of olefins, cyano-substituted olefins, and phenyl-substituted olefins, which organic compound contains from 2 to 20 carbon atoms with hydrogen cyanide in the presence of a compound of the structure $(Z_3P)_nM''(CO)_{6-n}$ wherein Z is selected from the class consisting of OR and R, wherein R is an aryl group having up to 18 carbon atoms, wherein M'' is selected from the class consisting of Mo and W, wherein $n$ is an integer of from 1 to 4 at a temperature of from $-25°$ C. to 200° C. and forming an organic cyano compound by addition of hydrogen cyanide to the olefinic carbon-carbon unsaturation of the unsaturated organic compound.

2. The process of claim 1 wherein $n$ is 3.
3. The process of claim 1 wherein Z is OR.
4. The process of claim 3 wherein M'' is W.
5. The process of claim 3 wherein M'' is Mo.
6. The process of claim 4 wherein the unsaturated compound is selected from the class consisting of 3-pentenenitrile and 4-penetenenitrile and the compound formed is adioponitrile.
7. The process of claim 5 wherein the unsaturated compound is selected from the class consisting of 3-pentenenitrile and 4-penetenenitrile and the compound formed is adiponitrile.
8. A process of isomerizing 3-pentenenitrile to 4-pentenenitrile which comprises contacting 3-pentenenitrile with a compound of the formula $(Z_3P)_nM'(CO)_{6-n}$ wherein Z is selected from the class consisting of OR and R wherein R is an aryl group having up to 18 carbon atoms, wherein M' is selected from the class consisting of Cr, Mo and W, and wherein $n$ is an integer of from 1 to 4.
9. The process of claim 8 wherein $n$ is 3.
10. The process of claim 9 wherein Z is OR.
11. The process of claim 10 wherein M' is Cr.
12. The process of claim 10 wherein M' is Mo.
13. The process of claim 10 wherein M' is W.

References Cited

UNITED STATES PATENTS 2,451,386 10/1948 Hager _____ 260—465.8
2,571,099 10/1951 Arthur et al. _____ 260—465.3

JOSEPH PAUL BRUST, Primary Examiner

U.S. Cl. X.R.

260—465, 465.9, 438.5, 441, 446, 429, 465.3